July 17, 1956   E. K. STILBERT, JR., ET AL   2,755,260
FIRE RETARDANT COATING COMPOSITION
Filed May 13, 1953
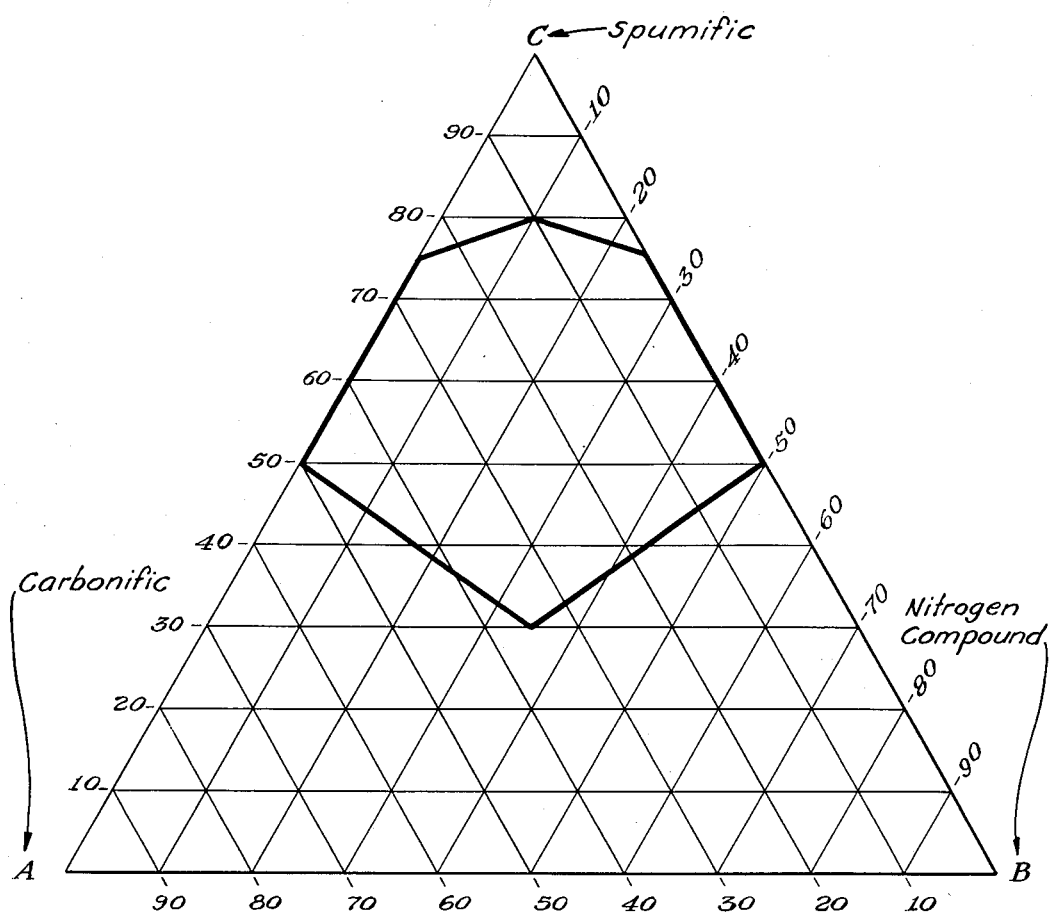
Proportions of Non-Film Forming Intumescent Solids in Coating.
Total Composition:
70-85% A+B+C.
30-15% Film-forming latex solids dispersed in water
INVENTORS
Elmer K. Stilbert, Jr.
Ira J. Cummings
James P. Talley
BY *Griswold & Burdick*
ATTORNEYS United States Patent Office 2,755,260
Patented July 17, 1956

2,755,260

FIRE RETARDANT COATING COMPOSITION

Elmer K. Stilbert, Jr., Ira James Cummings, and James P. Talley, Midland, Mich., assignors to The Dow Chemical Company, Midland, Mich., a corporation of Delaware Application May 13, 1953, Serial No. 354,676

13 Claims. (Cl. 260—17.4)

This invention concerns an improved intumescent coating composition and a wall member, such as fiber-board, coated therewith.

Intumescent coating compositions have been applied in the past to combustible materials for protection against fire. Some of these compositions are disclosed in U. S. Patents 2,452,054, 2,523,626, and 2,566,964. All of these coating compositions depend on formaldehyde, or some other reactive material to form a resin which may serve as a binding agent. The presence of reactive substances causes several disadvantages such as a narrow operative pH range and a short wet stable life of the formulated compositions. These previous coatings generally exhibit poor resistance to washing and scrubbing operations.

The provision of an intumescent fire-retardant coating with improved flexibility and resistance to washing and scrubbing operations is the principal object of this invention.

A further object is the provision of an intumescent fire-retardant coating composition based on non-reactive materials.

Still another object is the provision of an intumescent coating with an improved wet storage life.

Another object is to provide a fibrous wall member coated with a scrub-resistant intumescent fire-retardant coating.

The above and related objects are accomplished by this invention in which a combustible building material is provided with an abrasion-resistant, intumescent coating deposited from a 40 to 60 per cent aqueous dispersion of a mixture consisting of non-film forming intumescent solids and an aqueous film forming latex like dispersion of a polymeric material. The non-film forming intumescent solids consist of a foam-forming substance, a non-resinous carbon yielding substance, and an organic nitrogen compound.

Materials suitable as non-resinous carbonifics are carbohydrates, modified starches and similar substances, a water dispersible protein such as gelatin or casein, or a polyhydric compound from the class consisting of the hexitols, such as mannitol, the pentitols such as arabitol, or the mono-, or di-tetritols such as mono and di-pentaerythritol. It is also possible to use a mixture of two or more of the above-mentioned products. It is preferred to use pentaerythritol or the dimer of pentaerythritol, or mixtures of the two for the non-resinous carbonific. Commonly the commercial grades of monopentaerythritol contain minor amounts of the dimer.

While an organic nitrogen compound is not entirely essential, improved intumescence is obtained from a composition containing one. Amino compounds such as dicyandiamide, urea, dimethyl urea, guanylurea phosphate, and glycine are suitable organic nitrogen compounds. Of these, urea or dicyandiamide are preferred as the organic nitrogen compound.

At temperatures at or near the temperature of combustion of wood, the non-resinous carbonific and organic nitrogen compound in combination with a foam-producing agent, or spumific, forms a fire resistant carbonaceous foam. The spumifics that may be used in this invention are preferably monoammonium phosphate, diammonium phosphate, phosphoric acid, ammonium sulfate, sulfamic acid, ammonium sulfamate, ammonium bromide, sodium tungstate, or sodium borate.

The carbonific may be present in amounts of from 0 to 100 per cent of the weight of the spumific, and preferably 35 to 45 per cent. The organic nitrogen compound may be present in amounts of from 0 to 100 per cent of the weight of the spumific, but the preferred range is 5 to 20 per cent.

Such compositions, when employed without further modification lack resistance to abrasion. Therefore, a polymer latex, usually of about 50 per cent solids, is incorporated into the coating composition as a binder, so that the amount of the latex solids in the composition is from 5 to 35 per cent of the total solids, but preferably from 15 to 30 per cent. Any aqueous film-forming latex of a polymer may be employed. Examples of such latexes are the polymer of vinyl chloride, and copolymers of vinyl chloride and other vinyl esters, the copolymers of styrene and butadiene, vinylidene chloride and acrylonitrile, and vinylidene chloride and vinyl chloride. The last three are preferred, as they give the greatest scrub resistance to the compositions. As is known in the art, some latexes will form films of unplasticized polymer, while others require a plasticizer to be film-forming.

The latex may be prepared by any of the known procedures for polymerization in aqueous emulsion. Typically the monomer or monomers are added to an aqueous solution of a polymerization catalyst such as potassium persulfate or hydrogen peroxide and a surface active agent capable of emulsifying the monomers. Many suitable surface active agents are known to the art. The polymerizable mixture is agitated to effect emulsification and polymerization is initiated by heating the emulsified mixture usually between 35° and 100° C. The surface active agent is usually employed in an amount corresponding to from 0.5 to 5 per cent of the weight of the polymerizable organic compounds. The polymerization catalyst is usually added in an amount corresponding to from 0.5 to 5 per cent of the monomers. After polymerization is complete the resulting latex is filtered and if necessary to make it film forming, about 10 per cent plasticizer is thoroughly stirred into the latex. With those latexes which are no good film-formers it is sometimes advantageous to add a small amount of a thickening agent to enhance their film forming characteristics. Such thickening agents are usually hydrophilic colloids such as low viscosity methyl cellulose or sodium alginate.

In preparing the new coating composition, the various inert ingredients are initially mixed and ground together for several hours in a pebble mill, adding sufficient water to form a mixture of about 50 per cent solids content. By inert ingredients are meant those materials such as suspending pigments, dyes, fungicide or bactericides which may be desired in the coating for an effect such as color or mildew proofing, not associated with the flame-resistant characteristics of the coating. Examples of suitable suspending agents or dispersants are gum tragacanth, gum arabic, Irish moss and the like. Suitable well-known substances to counteract the fermentation of the carbohydrate or protein carbonific and the growth of fungi are sodium pentachlorophenolate, beta napthol, copper fluoride or other copper salts, boric acid, borax, zinc salts, fluorides, arsenates, arsenites and the like. To the pigment slip so-formed from the inert ingredients may be added the spumific and carbonific. The desired latex is finally stirred in for a short time. A smooth stable composition containing about 50 per cent total solids results.

The new coating composition, prepared in this manner, may be applied to any combustible building material to impart fire-retardant properties and to provide the material with a coating that is sufficiently resistant to abrasion to permit thorough washing without significant loss of the protective coating. The new composition may be applied by roller, brush, or spray application. When the coating is applied at the mill where the fiber-board is made, the coated article is usually dried by a heat treatment at a temperature of about 50° C. to 200° C. A coated board prepared in this manner is fire-retardant and its coating is substantially resistant to abrasion encountered in normal use or in washing operations.

The compositions which are useful for this invention will be more clearly defined with reference to the accompanying drawing in which apex A of the ternary composition chart represents the non-resinous carbonific such as mono and dipentaerythritols or mixtures of these compounds with starch or mannitol, apex B represents the organic nitrogen compound such as urea or dicyandiamide or mixtures thereof, and apex C represents the spumific such as monoammonium phosphate.

The preferred compositions are those which are in the area enclosed within the heavy black-line on the drawing. When more spumific than the stated amount is used, the walls of the heat-generated foam are fractured by the excessive gassing of the spumific. When the non-resinous carbonific is more than the stated amount, insufficient spumific is present to form the deep foam needed for insulating the combustible coated material. When an excess of urea or dicyandiamide is present, the degree of intumescence is again too low.

As a further illustration of the invention, the following examples are offered in tabular form in which all parts are by weight. All of the compositions were made by the aforementioned procedure in which the inert ingredients were ground in a pebble mill for 3 hours with sufficient water to form a mixture of about 55 per cent solids content. To the resulting pigment slip containing the inert ingredients, the pentaerythritol, monoammonium phosphate, and dicyandiamide were added with stirring in the amounts shown in Table I. Subsequently, the latex was added and mixed with the other ingredients for 10 minutes.

Each of the compositions was sprayed evenly over the surface of 12 inch square panels (⅜ inch thick) of low density, previously uncoated fibrous wall-board. The coated panels were dried at 158° F. for 10 minutes followed by a 5 minute period at 302° F. The dry coated panels were then aged 16 to 20 hours at 75° F. and 50 per cent relative humidity. These panels were then exposed to flame in a standard fire test to determine the degree of intumescence and the area of surface char of each coating. The fire test consisted of exposing the coated surface of a panel, inclined at an angle of 45 degrees, to the complete burning of 1 cc. of absolute alcohol, the alcohol flame being focused on the board at a point about 2 inches above the lower end of the panel. This fire test is described in Commercial Standard CS-42-49, U. S. Department of Commerce Bulletin, "Structural Fiber Insulating Board" (4th ed.). The amount of protection that each coating composition provides for each panel is rated according to amount of intumescence and according to the area of surface char. Maximum fire retardant qualities are shown by those coatings which provide excellent intumescence (maximum depth of foam after exposure to flame) and minimum area of surface char.

*Table I*

|  | 1 | 2 | 3 | 4 | 5 | 6 | 7 | 8 | 9 |
|---|---|---|---|---|---|---|---|---|---|
| Mono ammonium phosphate | 44 | 26.4 | 66 | 66 | 44 | 70 | 17.6 |  | 17.6 |
| Dicyandiamide |  | 30.8 | 22 |  | 44 | 9 | 13.2 | 44 | 57.2 |
| Pentaerythritol | 44 | 30.8 |  | 22 |  | 9 | 57.2 | 44 | 13.2 |
| Titanium dioxide | 12 | 12 | 12 | 12 | 12 | 12 | 12 | 12 | 12 |
| Sodium alginate | 0.6 | 0.6 | 0.6 | 0.6 | 0.6 | 0.6 | 0.6 | 0.6 | 0.6 |
| Water | 45 | 45 | 45 | 45 | 45 | 45 | 45 | 45 | 45 |
| Plasticized latex [1] | 17.5 | 17.5 | 17.5 | 17.5 | 17.5 | 17.5 | 17.5 | 17.5 | 17.5 |
| Char area | 11 | 12 | 12 | 10 | 11 | 11 | 16 | 20 | 15 |
| Intumescent rating [2] | 3 | 3 | 3 | 3 | 2.5 | 3 | 1.0 | 0 | 0.5 |

[1] Copolymer of 75% vinyl chloride-25% vinylidene chloride plasticized with 10% monooctyl diphenyl phosphate.
[2] 0=no intumescence; 1=very slight intumescence; 2=poor intumescence; 3=fair intumescence; 4=good intumescence; 5=excellent intumescence.

It is also possible to replace a minor amount of the pentaerythritol with starch. The effect of such a replacement may be seen by the Examples 10 to 14 tabulated in Table II. These samples were prepared in the same manner as those in Table I. In addition, however, a 4 inch by 12 inch strip was cut from the uncharred portion of each of the coated panels and these were tested for abrasion resistance, according to Federal Specification TT-P-38a using a 0.5 per cent soap solution and 100 oscillations of the scrubbers. The "Gardner Straight Line Scrub Tester-Model 105" (obtained from Gardner Laboratory Inc., Bethesda, Maryland) was used in the standard scrub test. At the end of 100 oscillations (200 strokes of the brush), a panel whose surface is still completely covered with coating, is one that exhibits maximum resistance to abrasion. A coated panel that exhibits no resistance to abrasion, is one whose board surface is completely exposed and the fire-retardant coating is completely removed after 100 or fewer cycles under the Gardner tester.

*Table II*

| Example | 10 | 11 | 12 | 13 | 14 |
|---|---|---|---|---|---|
| Mono Ammonium Phosphate | 56 | 56 | 56 | 56 | 56 |
| Dicyandiamide | 10 | 10 | 10 | 10 | 10 |
| Pearl Corn Starch | 21.2 | 15.9 | 11.2 | 5.3 |  |
| Pentaerythritol |  | 5.3 | 10 | 15.9 | 21.2 |
| Titanium Dioxide | 12 | 12 | 12 | 12 | 12 |
| Sodium Alginate | 0.6 | 0.6 | 0.6 | 0.6 | 0.6 |
| Water | 75 | 75 | 75 | 75 | 75 |
| Plasticized latex [1] | 25 | 21 | 21 | 21 | 21 |
| Intumescent rating [2] | 3.5 | 4.5 | 4.5 | 4.75 | 5.0 |
| Wet Scrub Cycles [3] | 350 | 400 | 420 | 800 | 550 |

[1] See Table I.
[2] See Table I.
[3] Number of wet scrub cycles to expose 10% of the board's surface.

As can be seen in Table II, as the amount of starch is increased both the intumescent rating and the scrub resistance decrease. It is preferred to maintain the amount of starch at less than 15 per cent of the amount of spumific present.

It should be understood that the drawing and Tables I and II illustrate primarily that part of the compositions which is concerned with the amount of intumescence that is produced by the compositions. However, a good resistance to washing and scrubbing operations is highly desirable. This effect is achieved in these compositions by incorporating a polymer latex into the mixtures as a binding agent. The value of a polymer latex in achieving this result is illustrated in Examples 15 through 20 shown in Table III in which all parts are by weight. In all of these examples the polymer latex was added to the same formulation in the amounts as shown, and the final composition was evaluated by the previously mentioned methods.

Table III

| Example | 15 | 16 | 17 | 18 | 19 | 20 |
|---|---|---|---|---|---|---|
| Plasticized copolymer; latex solids [1] | 0 | 8.1 | 20 | 31 | 43 | 59 |
| Percent Binder content | 0 | 7.5 | 16.5 | 23.5 | 30.5 | 37 |
| Intumescent rating [2] | 4.0 | 4.0 | 3.5 | 3.0 | 2.0 | 1.0 |
| Wet scrub cycles [3] | 20 | 50 | 200 | 1,000 | 1,500 | >2,000 |

[1] See Table I.
[2] See Table I.
[3] See Table II.

Example 18 with 23.5% latex binder has 50 times more resistance to scrubbing than Example 15 which contains no latex. Above 25% latex binder it can be seen that the wet scrub resistance is even better, but the intumescent rating of the composition falls below the minimum preferred rating of 3.0. Thus, Table III also illustrates the desirability of maintaining the amount of latex solids in the preferred range.

The invention has been illustrated with respect to the preferred copolymer of vinyl chloride and vinylidene chloride as the chief solid constituent of the latex employed. Improved intumescent coatings are also obtained when the latex is one of a copolymer of vinylidene chloride and acrylonitrile or a copolymer of butadiene and styrene.

We claim:

1. An intumescent coating composition comprising a 40 to 60 per cent aqueous dispersion of a mixture consisting of 70 to 85 per cent of non-film-forming intumescent solids and enough of an aqueous film forming latex of a polymer selected from the group consisting of the polymer of vinyl chloride, copolymers of vinyl chloride and other vinyl esters, copolymers of vinylidene chloride and vinyl chloride, copolymers of vinylidene chloride and acrylonitrile, and copolymers of styrene and butadiene to provide correspondingly from 30 to 15 per cent of the polymer solids; based on the total weight of solids present; said intumescent solids consisting essentially of (1) a foam forming ingredient selected from the group consisting of monoammonium phosphate, diammonium phosphate, phosphoric acid, ammonium sulfate, sulfamic acid, ammonium sulfamate, ammonium bromide, sodium tungstate, and sodium borate; (2) from 10 to 70 per cent, based on the weight of the foam forming ingredient, of at least one polyhydric compound from the class consisting of starch, the hexitols, the pentitols, and the mono-, and di-tetritols, the amount of any starch employed being less than 15 per cent of the weight of said foam forming ingredient; and (3) from 0 to 55 per cent, based on the weight of the foam forming ingredient, of an amino compound from the group consisting of glycine, urea, dimethyl urea, guanyl urea, guanidine, and dicyandiamide.

2. The composition as claimed in claim 1 wherein the latex is one of about 50 per cent solids.

3. The composition as claimed in claim 1 wherein the polymeric material is a film-forming copolymer of vinylidene chloride and vinyl chloride.

4. The composition as claimed in claim 1 wherein the polymeric material is a film forming copolymer of vinylidene chloride and acrylonitrile.

5. The composition as claimed in claim 1 wherein the polymeric material is a film forming copolymer of styrene and butadiene.

6. The composition as claimed in claim 1 wherein the organic nitrogen compound is urea.

7. The composition as claimed in claim 1 wherein the organic nitrogen compound is dicyandiamide.

8. The composition as claimed in claim 1 wherein the polyhydric compound comprises mono pentaerythritol.

9. The composition as claimed in claim 1 wherein the polyhydric compound comprises dipentaerythritol.

10. The composition as claimed in claim 1 wherein the polyhydric compound comprises a mixture of starch and pentaerythritol.

11. As an article of manufacture, a normally combustible building material coated with the abrasion resistant composition claimed in claim 1 to render the article fire retardant.

12. A cellulosic building material coated with the composition claimed in claim 1.

13. A fiber-board coated with the composition claimed in claim 1.

References Cited in the file of this patent
UNITED STATES PATENTS
2,452,055    Jones et al. _____ Oct. 26, 1948